(12) United States Patent
Tamburrino

(10) Patent No.: US 10,468,642 B2
(45) Date of Patent: Nov. 5, 2019

(54) RECHARGEABLE STORAGE BATTERY WITH IMPROVED PERFORMANCE

(71) Applicant: Iterna, LLC, Aurora, IL (US)

(72) Inventor: Peter Christ Tamburrino, Antioch, IL (US)

(73) Assignee: Iterna, LLC, Aurora, IL (US)

( * ) Notice: Subject to any disclaimer, the term of this patent is extended or adjusted under 35 U.S.C. 154(b) by 267 days.

(21) Appl. No.: 15/156,305

(22) Filed: May 16, 2016

(65) Prior Publication Data
US 2016/0260943 A1  Sep. 8, 2016

Related U.S. Application Data

(63) Continuation-in-part of application No. 13/986,639, filed on May 20, 2013.
(Continued)

(51) Int. Cl.
*H01M 10/0525* (2010.01)
*H01M 2/10* (2006.01)
*H01M 10/42* (2006.01)

(52) U.S. Cl.
CPC ....... *H01M 2/105* (2013.01); *H01M 10/0525* (2013.01); *H01M 10/4257* (2013.01); *H01M 2220/30* (2013.01)

(58) Field of Classification Search
CPC ............. H01M 2/105; H01M 10/4257; H01M 10/0525
(Continued)

(56) References Cited

U.S. PATENT DOCUMENTS

2002/0122983 A1   9/2002  Nakai et al.
2002/0167293 A1*  11/2002  Ptasinski ............ G01R 31/3648
                                                   320/132
(Continued)

FOREIGN PATENT DOCUMENTS

CN          202550874 U  * 11/2012

OTHER PUBLICATIONS

Li et al. CN 202550874 U. Published Nov. 21, 2012. English translation by EPO. (Year: 2012).*
(Continued)

*Primary Examiner* — James Lee
(74) *Attorney, Agent, or Firm* — Hojka Qadeer, LLC; Cory L. Hojka

(57) ABSTRACT

The present disclosure provides an improved high watt-hour lithium ion rechargeable battery pack including a plurality of cells not comprising a multiple of eight and an electrical circuit to provide a battery pack that mimics eight cells in series. In particular, the present disclosure relates to a battery pack comprising a non-multiple of eight cells of the type typically used in a 2590 battery pack and a corresponding mechanical packing assembly. The improved electromechanical design may provide an increased capacity and reduced heat of the cells upon discharge as compared to a standard 2590 battery pack, and may also avoid an imbalance that may arise when using multiple internal battery packs. The disclosed improved battery packs require only one control circuit to provide voltage regulation as well as the protection, balancing, and fuel gauge circuit functions for all of the energy cells, leading to reductions in both complexity and cost.

19 Claims, 4 Drawing Sheets

Related U.S. Application Data

(60) Provisional application No. 61/688,729, filed on May 18, 2012.

(58) Field of Classification Search
USPC .............................................................. 429/7
See application file for complete search history.

(56) References Cited

U.S. PATENT DOCUMENTS

| | | |
|---|---|---|
| 2005/0271934 A1 | 12/2005 | Kiger et al. |
| 2009/0317696 A1 | 12/2009 | Chang |
| 2011/0064997 A1 | 3/2011 | Peskar et al. |
| 2012/0301747 A1* | 11/2012 | Han ................... H01M 2/1005 |
| | | 429/7 |

OTHER PUBLICATIONS

"AccuPower Lithium Battery 4S7P 14,8Volt in housing," Amazon.co.uk, Jan. 5, 2012, <http://www.amazon.co.uk/AccuPower-Lithium-Battery-8Volt-housing-grey/dp/B0060HZQ0G>.
"Pack Type: AP AP1415-GG," Jan. 5, 2012, AccuPower.
"MIL-PRF-32383/3 Performance Specification Sheet," Jun. 16, 2011, <http://www.everyspec.com>.

\* cited by examiner

RECHARGEABLE STORAGE BATTERY WITH IMPROVED PERFORMANCE

CROSS-REFERENCE TO RELATED APPLICATIONS

This application is a continuation-in-part of U.S. Non-Provisional patent application Ser. No. 13/986,639, filed on May 20, 2013, which claims the benefit of and priority to U.S. Provisional Patent Application Ser. No. 61/688,729, filed on May 18, 2012, the disclosures of which are incorporated herein in their entireties by reference.

BACKGROUND

Field of the Invention

The present disclosure relates generally to electrical storage batteries and, in particular, to battery packs having a plurality of rechargeable cells electrically coupled to each other and to a control circuit disposed within a common housing. In particular, the present disclosure relates to a plurality of lithium ion cells arranged according to an improved internal packing configuration. These cells, and additional components such as a control circuit, are disposed within a housing, such as a housing of conventional size and design.

Description of the Related Art

There has been interest in the electrical power supply industry to provide rechargeable battery systems having a compact, lightweight construction made with relatively inexpensive components such as readily commercially available individual storage cells coupled together and operating under the control of one or more control circuits so as to provide advanced functions such as fuel gauging, cell balancing, and communication via a serial data communications bus.

In addition to battery capacity needed to drive the intended load, demands arise from the nature of the application and the intended use of the load and battery system. An example of one particularly challenging field of use is that of modern rugged mobile military applications. Military applications now demand higher performance, lower weight, longer effective usage times, and high reliability for mobile, handheld applications such as navigation, fire control, and Multiband Inter/Intra Team Radios (MBITR). These systems rely on increasingly sophisticated battery packs for their power requirements, yet they present unique design challenges because of the extreme environments to which they are exposed. Design engineers are faced with an array of challenges in developing effective battery systems—from cell and cell pack selection to intelligent power management, and from safety concerns to charging systems. For example, should the battery system undergo full or partial power failure, a command signal may change state in an unexpected and undesired manner. Armed with an understanding of these demands, however, designers can make the best choices for battery-supplied power in modern rugged military applications.

Without a simple and cost-effective charging system coupled with reliable rechargeable battery chemistry, the significance of portable lightweight battery energy sources would drop as a practical reality and have a far less impact on modern technology. Handheld radios, telemetry monitors, weather stations, test equipment, missiles, rockets, satellites, and a myriad of other equipment all rely on cost-effective reliable rechargeable battery technology for their operation. Indeed, without practical rechargeable battery systems, devices would be too cumbersome in their operation for everyday use.

Arguably, the most promising widespread rechargeable battery technology in use today is lithium ion technology. This battery chemistry technology was first discovered in 1912 and the first lithium batteries were proposed around 1970. As is true in many other disciplines, substantial advancements in the technology were not made until new materials with superior performance characteristics were developed. Today, lithium ion technology takes many forms. Perhaps the greatest and most promising form is that of lithium cobalt oxide (Li-cobalt), but lithium manganese oxide (Li-manganese), lithium iron phosphate (Li-phosphate), lithium nickel manganese cobalt oxide (NMC), lithium nickel cobalt aluminum oxide (NCA) and lithium titanate (Li-titanate) also play a substantial, commercially significant role.

Lithium ion (Li-ion) cell characteristics include a nominal voltage of 3.6 V, 1000 duty cycles per lifetime, a rate load current of less than 4 C, an average energy density of 160 Wh/kg, a charge time of less than 4 hours, and a typical discharge rate of a few percent per month when in storage. Li-ion cells operate effectively between −20° C. and 60° C. With recent improvements in battery chemistry, most notably new chemical formulations, the range is extended from −30° C. to 80° C.

Principally, three primary components come together to form a lithium-ion cell. These include a positive electrode or cathode, made from a layered metal oxide such as lithium cobalt oxide, a polyanion such as lithium iron phosphate, or a spinel such as lithium manganese oxide. Also included is a negative electrode or anode made, for example, from carbon, graphite, or the like. An electrolyte surrounds the electrodes and may comprise, for example, a lithium salt suspended in an organic solvent. Examples of electrolytes also include mixtures of organic carbonates such as ethylene carbonate or diethyl carbonate. Since pure lithium is highly reactive, battery designers frequently opt to use a non-aqueous electrolyte. Of importance here is the recognition that these various material types making up a lithium ion cell must be compatible with one another and when combined in a battery system, the voltage, capacity, operational life, and operational safety of the resulting lithium-ion battery can take on a wide variety of values. Typically, the electrodes and electrolyte are protected by an outer container sealed to prevent the intrusion of water. Compared to other battery chemistries, lithium-ion battery systems require careful control in their operation to limit peak voltages and to prevent a wide array of damage to the battery system.

After construction, a lithium-ion cell must be charged in order to acquire energy which is stored in the battery for later use. When the battery is being charged, lithium ions are liberated from the positive electrode and move through the electrolyte to the negative electrode where they remain. During discharge, the lithium ions move in the reverse direction across the electrolyte toward the positive electrode, producing energy for an external device through electron flow through the device, a process interconnected to that of ion flow within the cell.

As will be seen herein, the present disclosure describes an application with lithium-ion cells having a cylindrical form. However, as will be appreciated from studying the materials herein, the present disclosure also describes practical applications using other shapes or formats of lithium-ion cells, including those having a soft flat body or pouch, as well as larger cylindrical shapes which include terminals affording ready mechanical connection to external devices.

As mentioned, the present disclosure describes uses of lithium ion technology with rechargeable battery systems. However, in the field of lithium ion technology, these types of systems all have a limited thermal operating range. At times, it is necessary to provide portable lightweight electrical power in environments having extreme temperature ranges. A classic solution to overcome this type of problem has been to use non-rechargeable battery systems, typically referred to as primary lithium battery systems. The present disclosure is also relevant to non-rechargeable or primary battery systems. In extreme applications, rechargeable battery chemistries may not be able to perform in a reliable manner. In this instance, disposable, one-time-use lithium cells (known as lithium-primary cells) may be considered. These lithium-primary cells feature a nominal voltage of 3.6 V, an optimal load current of less than 5 C, an average energy density of 160 Wh/kg and a negligible self-discharge rate supporting years of storage.

The range of anticipated operating temperatures often lies at the heart of extreme applications. By way of example, lithium-primary cells have been known to operate in temperatures ranging from −40° C. to +80° C. Examples of lithium-primary chemistries include lithium thionyl chloride (Li/SOCl2), lithium sulfur dioxide (Li/SO2), and lithium manganese dioxide (Li/MnO2).

Although the present disclosure discusses a wide array of lithium-ion technologies, it applies equally well to different types of battery chemistries, employing materials unrelated to those of lithium-ion systems. As will be seen herein, in one aspect, the present disclosure is directed to systems of battery packs, which employ a plurality of individual cells physically associated together and electrically coupled together to operate as a single entity. Thus, the present disclosure is concerned with balancing the compatibilities among all of the components employed within the systems, despite the precise nature of any particular system. Such considerations will come to the fore when considering the development of control circuitry designed to protect the system as a whole as well as to provide balance among its various components so as to optimize overall system performance.

One ongoing challenge has been to offer greater battery capacities in ever smaller sized packages. A special example of this industry goal is to provide increases in energy capacity for conventional, standardized packages that are well defined in the industry. Battery systems are not readily miniaturized using photolithographic and other popular techniques, as may be possible with other electronics components. Rather, reductions in battery size are more usually accompanied by improvements in battery materials to enable greater energy storage in a smaller sized package. This of course may be accompanied by changes in battery chemistry. The present disclosures describes advantages of increasing the capacity of battery packs, regardless of any particular chemistry employed or whether the battery cells are rechargeable.

Approaching the problem from a different perspective, there remains a need to adapt and improve upon known commercial products to reduce overall operating expenses by eliminating the need for additional training of end-users and maintenance technicians. A special example of this is in the realm of military applications, where familiarity with new, improved products is vital to mission success, where lives are placed at risk in the interest of national defense. As is well known to those employed in the battlefield, it is surprising how quickly even very small changes can spin out of control in a critical, life-threatening situation. Reducing complexity and increasing familiarity with systems allows greater attention to be directed to the task at hand.

Apart from using known systems in a known way, it is frequently necessary to adapt or customize a system to meet changing conditions. By reducing the need to pay attention to changes in standardized systems, a user can devote greater energy to adapting a given system to meet unusual, unforeseen requirements. As a related benefit, by keeping improvements in existing equipment transparent to the user, greater use can be made of related accessories. As those responsible for systems operation will attest, oftentimes the array of accessories can outweigh the system they support.

As with other types of electronic components, battery systems are becoming more sophisticated and have a tendency to use newer materials that exhibit sensitivities and requirements not previously encountered. With the ability to apply increasingly complex electronic controls, materials and component arrangements that are more inherently unstable may be made reliable in a practical environment. Nonetheless, the overall package must, as always, be rugged and capable of withstanding harsh environmental conditions. Controls needed to maintain a high standard of systems reliability must however not be prohibitively expensive or unusually difficult to deploy in practical real-world products. As will be seen herein, the present disclosure describes these desired types of improvements, thus delivering advantages without unnecessary downside risk.

As systems managers will immediately appreciate, substantial cost advantages can be achieved whenever a system can be constructed from a smaller variety of different types of components. For example, inventory costs are reduced, and critical components are easier to stock and are more readily obtained in the available marketplace. In addition, training costs are reduced, and it is more likely that peripheral knowledge and skills developed for similar but not identical products can be brought to bear for products being designed and deployed. As a result, design times for new products can be greatly reduced. The present disclosure describes such advantages and simplified construction of the battery packs and other battery systems.

Despite numerous advances, there remains a need for relatively simple, durable devices to provide portable and lightweight electrical energy sources.

SUMMARY

With the advent of portable lightweight electronics devices, the need for reliable cost effective portable lightweight energy sources has increased dramatically. A popular format for battery storage energy sources is the so-called "battery pack." Battery pack systems typically include a plurality of energy storage cells, coupled together and disposed within an outer container. Electrical terminals are provided to connect the internal energy cells to external load devices. It has become increasingly popular to provide some manner of visual gauge to provide a ready estimate of the remaining battery life, and often to also indicate critical operating parameters such as output voltage and temperature conditions within the battery pack.

As mentioned, the present disclosure is not intended to be limited to any particular battery chemistry or type. However, initial attention has been focused on lithium-ion battery technology arranged in an industry standard "2590 battery pack" type. In this type of arrangement, pluralities of lithium ion cells are disposed, along with one or more control circuits, within an outer surrounding housing. The individual cells are electrically coupled together according to a defined configuration, by electrically conductive interconnects, which in turn are coupled to battery pack terminals for communication with external load devices.

Although a number of different configurations may be theoretically possible in the abstract sense for standardized battery types, industry standard 2590 battery packs have been provided with 24 lithium-ion cells, thus setting the overall energy capacity of the battery pack, typically estimated as 24 times the energy capacity of each individual cell. Because the 2590 battery packs have been well defined in the commercial marketplace, it is not possible to improve battery capacity by enlarging the standardized size of the outer battery pack container. Rather, as will be seen herein, additional energy cells are disposed within the standardized size container. In addition, it has become accepted practice to divide the total number of cells in two to form two packs or sections. The packs are then coupled to one another in series or parallel to provide two different operating voltages, with the higher voltage usually being double that of the lower output voltage.

In some embodiments, the cells in a battery pack may be arranged in a combined series/parallel arrangement that is sufficient to provide a lower operating voltage expected by a user. A voltage regulator circuit may boost the lower voltage to an upper voltage level expected by the user. In this manner, the battery pack meets the user's customary expectations. In addition to the voltage regulator circuit, other control functions may be provided by an internal control circuit disposed within the outer housing. Using the battery packs of the present disclosure may provide the user an immediate increase in battery power.

In some embodiments, the battery pack may be employed in electronics devices. The pack may include an outer housing supporting an electronic control module and a battery terminal block connected to the control module. A plurality of individual energy cells may be disposed within the housing and may be coupled to each other, the control module, and the terminal block. A plurality of sense wires coupling the energy cells to the control module may also be included.

The present disclosure also describes an exemplary internal component arrangement within a battery pack. The pack may include a housing and a housing cover. The arrangement may include a plurality of energy cells assembled beforehand for later insertion in the housing.

In some embodiments, a battery pack for a cordless power device comprises a housing defining a hollow cavity and a plurality of rechargeable energy cells disposed within the hollow cavity of the housing. The number of energy cells may be divisible by a number other than 8, and the energy cells may be coupled together to provide a lower maximum voltage than that required by the user. A plurality of interconnecting links may electrically couple the energy cells together and may provide a convenient internal component arrangement that may be fabricated prior to insertion within the outer housing. A control circuit may be electrically coupled to the energy cells to control the operation of the energy cells during charging and discharging of the energy cells and to perform other protective and power management functions. The control circuit may also include a voltage boost function that raises the output voltage of the energy cells to a maximum voltage required by the user.

The present disclosure describes applications in the field of smart battery packs that are capable of self-monitoring, wherein the voltage of each energy cell is individually monitored by a controller in the pack, such as a microprocessor, microcontroller, etc. This requires that each energy cell be wired up to the controller.

DETAILED DESCRIPTION OF THE PREFERRED EMBODIMENTS

As will be seen herein, the present invention can be readily applied to lithium cobalt oxide (Li-cobalt), lithium manganese oxide (Li-manganese), lithium iron phosphate (Li-phosphate), lithium nickel manganese cobalt oxide (NMC), lithium nickel cobalt aluminum oxide (NCA), lithium titanate (Li-titanate), and other battery chemistries.

In some embodiments, a battery pack device provides electrical power for a variety of different electrical devices. The battery pack device is described herein in its usual assembled position as shown in the accompanying drawings and terms such as upstream, downstream, inner, outer, upper, lower, horizontal, longitudinal, etc., may be used herein with reference to this usual position. However, the device may be manufactured, transported, sold, or used in orientations other than that described and shown herein.

Figure 1:
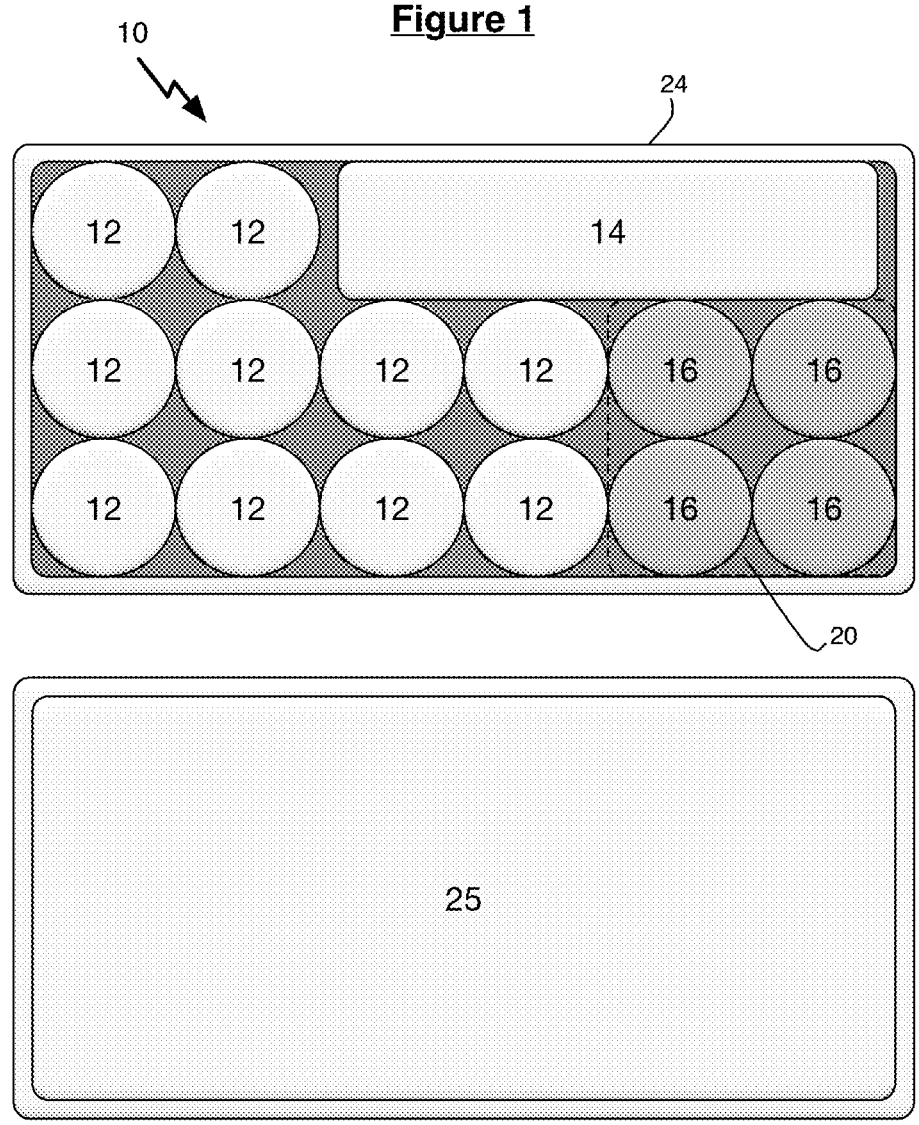
FIG. 1 is an example of a battery pack according to principles described herein.

FIG. 1 shows a battery pack 10. Battery pack 10 may include a plurality of rechargeable energy cells disposed within the hollow cavity of a housing 24. Preferably, housing 24 is made of a hard, tough plastic material formed by injection molding or other material suitable for preventing damage to the batteries and other elements therein. The energy cells may be enclosed within the housing 24 by a cover 25, shown in FIG. 1. Also included in battery pack 10 may be a control circuit and interconnects electrically coupling the energy cells together, which are not shown in FIG. 1.

In some embodiments, the cells may be arranged in an internal component arrangement, preferably before being inserted within a housing 24. The arrangement may be held in place by a plurality of interconnect straps which may be welded, soldered, or otherwise secured to the terminals of the energy cells in a manner known in the art. Interconnects may comprise conductors having other forms, such as a wire form, if desired.

The principles disclosed herein may be applied to a wide variety of battery packs and other battery products. The disclosure herein will describe embodiments with regard to an industry standard "2590 battery pack" type. This type of battery pack has demonstrated high rate capability, is lightweight, has high energy density, and provides long operating life and long shelf life while operating in a wide range of temperatures. Such a conventional battery is typically rated at about 206-215 Wh (watt-hours) and is suitable for use in communications, medical, military, and instrumentation applications where extended battery life is critical. In this type of arrangement, a plurality of lithium-ion cells and one or more control circuits are arranged within an outer surrounding housing.

The cells may serve as the primary energy source of the battery pack. Cells include a positive terminal adjacent to its cathode electrode, and a negative terminal adjacent to its anode electrode. The cathode and anode terminals are separated by a thin plastic film or separator. All three elements are maintained in an electrolyte medium to promote charge transfer between the electrodes that releases stored battery power.

A large number of 18650-type cells have been placed in widespread commercial use. This type of cell has its components contained in an outer cylindrical metal enclosure employed as a negative terminal. The cylindrical 18650 cells are efficient at distributing heat generated from the center of the cell to the cell exterior. Heretofore, 2590-type battery packs have been provided with 24 energy cells arranged in two packs or sections, to provide either a nominal 15 V output (as when the two sections are coupled in parallel) or a 30 V output, when the energy cells are all connected in series with one another. As a result, overall battery capacity is bounded by the precise type of energy cell employed and the output voltage desired.

As mentioned, it is generally preferred to use rechargeable lithium-ion 18650-type energy cells, which are available from a variety of different sources. Accordingly, it is to be expected that the battery capacity of the individual energy cells might vary from one source to another, thus providing a designer of battery packs with a range of choices for the makeup of the internal energy cells components disposed within the housing 24. Assuming, for example, that 18650-type cells having a battery capacity of 3.0 Ah are considered, the overall capacity of battery pack 10 may yield (3.7 V/cell) (24 cells) (3.0 Ah) or 266.4 Wh. While the overall battery capacity can vary somewhat depending upon the commercial source of the energy cells, the capacity is generally observed to fall within a relatively narrow range of values due to practical, commercially available choices. In some embodiments, the internal component arrangements of energy cells within housing 24 may be improved to allow additional standard-sized readily commercially available energy cells, thus substantially increasing the capacity of the battery pack.

In some embodiments, the control circuit may perform a number of different functions. For example, in addition to minimizing thermal effects due to discharge under load, the control circuit may also control the charge rates of the energy cells. Consider, for example, a 18650 Li-cobalt cell. Even though this type of battery gives a high specific energy, it cannot be charged and discharged at a current higher than is stated in the battery's specification. For example, an 18650 cell with a 2,000 mAh battery capacity and charge rating of 0.5 C can only be charged at a maximum rate of 1,000 mA. The same battery may also state that the C-rating is 1 C, which means that the battery can only be discharged at a maximum rate of 2,000 mA. Forcing a fast charge above 1,000 mA or applying a load higher than 2,000 mA for such a battery may cause overheating and undue stress. One manufacturer recommends a charge rate of 0.8 C at a level less than 2,000 mA for an optimal fast charge. The control circuit may limit the charge and discharge rate to a safe level of about 1 C or as otherwise specified (e.g., 0.5 C for charging and 5 C for discharging).

In some embodiments, the control circuit may control safety and power management. The circuit may be packaged in the form of a printed circuit board having not only protection circuitry and thermal sensors but also providing the system intelligence for advanced functions such as fuel-gauge calculations on remaining cell capacity, cell balancing, managing thermal sensors such as thermistors to monitor internal pack temperature and to register not only operating temperature at the core but also at the edge of the pack as well as outside the enclosure. The control circuit may also provide other advanced functions, such as LEDs that indicate pack or cell status, or a serial data communications bus that communicates with the host device.

As mentioned, battery protection functions are often included to limit the charge and discharge rates to safe levels. Since the cells are most critically affected by extreme temperatures, many of the advanced functions may be employed for temperature control in one way or another. For example, forcing a fast charge or applying a load higher than recommended may cause overheating and undue stress. Also, the battery's chemical reaction at high discharge rates may generate a substantial amount of heat, and the effects of this heat may be factored into a practical battery pack design. The effect of the generated heat is compounded in a multi-cell battery pack. Accordingly, the control circuit may be employed to limit the charge and discharge rates to safe levels in this regard as well. Active safety circuits have been required for some time now to ensure that commercially important battery chemistries are kept in a stable condition.

Each rechargeable battery chemistry has its own set of risks that must be managed on an ongoing basis. Li-ion batteries may require the greatest degree of protection, such as a thermal shutdown separator and exhaust vents (within each cell) to vent internal pressure. Typically, vent holes are unobstructed openings that expel potential gas vented from cells when the cells are stressed under load or subject to high temperature environmental conditions. In some applications, high-pressure vent holes are also provided to moderate internal pressures by exhausting warm air within a battery pack only after a specific pressure has been reached within the battery pack. As long as the pressure is not increased to a dangerous level within the battery pack, high-pressure vent holes may control heat generated within the battery pack.

An external safety circuit that prevents overvoltage during charge and undervoltage during discharge may often be provided, along with one or more thermal sensors to prevent thermal runaway. Adequate battery protection may be provided to afford an appropriate level of safety and may be incorporated into the battery pack design. This attention to detail is warranted, however, since Li-ion battery packs have the potential of offering the most attractive method of portable battery power. As a result, many of the portable devices using older battery chemistries have migrated to Li-ion in recent years.

In addition to these and other functions, a control circuit also may have a voltage boost capability, allowing the energy cells of the battery pack to be coupled together for a lower voltage than would otherwise be required. With voltage boost provided by the control circuit, this lower voltage can be increased as desired to a maximum level.

Referring again to FIG. 1, a view from the top of an example of a battery pack is shown. The plurality of energy cells is configured in different internal component arrangements, even though each of the energy cells is preferably identical to one another, to prevent load imbalance and the premature failure of the overall battery pack. As shown in FIG. 1, one such arrangement consists of an upper layer arrangement of energy cells and a bottom layer of energy cells which is partially obscured by the presence of the upper layer.

Figure 2:
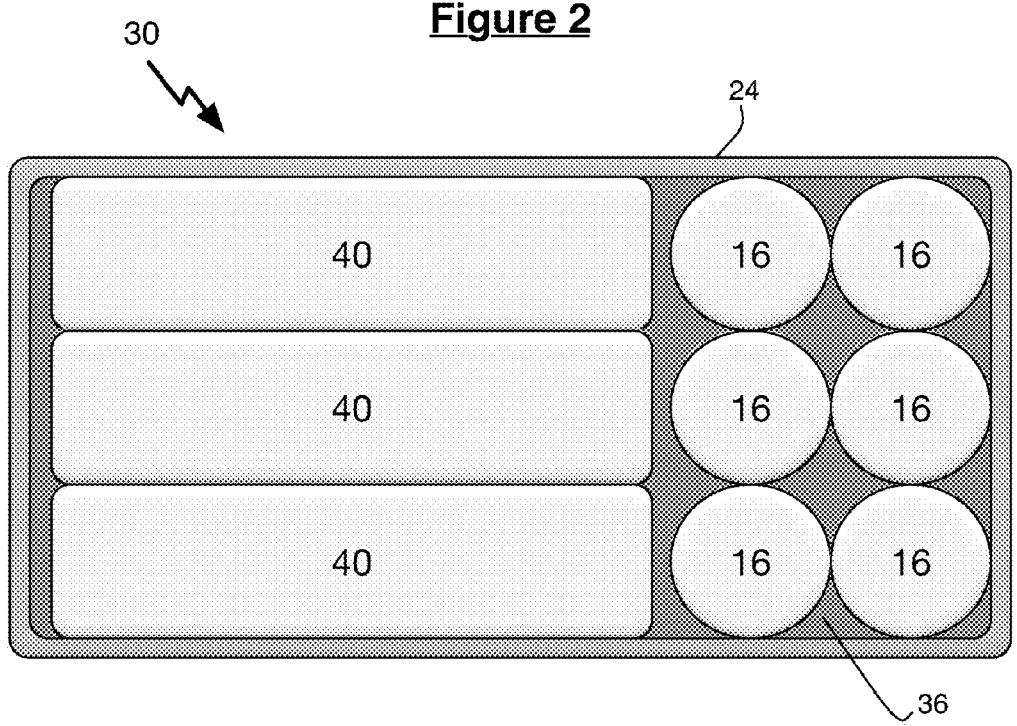
FIG. 2 is an example of the lower level components of the arrangement of FIG. 1.

The lower level internal energy component assembly is shown in FIG. 2. As mentioned above, the bottom-most array of upright energy cells 16 is only partially visible in FIG. 1. In the bottom layer, six energy cells 16 may be disposed in an upright position and, as shown in FIG. 2, an array of nine energy cells 40 may be disposed in a reclined position along side energy cells 16, wherein the energy cells 40 are arranged in three stacks, each stack being three cells deep.

Figure 3:
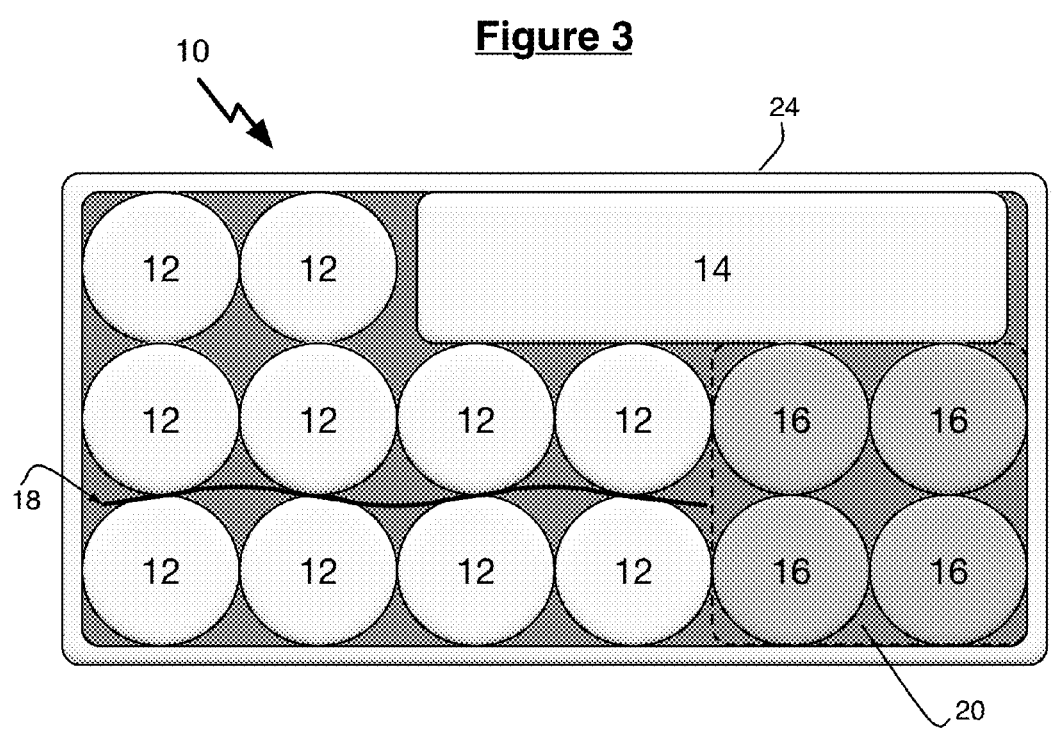
FIG. 3 is an example of the upper level components of the arrangement of FIG. 1.

In the upper layer, ten energy cells 12 may be disposed in an upright position and, as shown in FIG. 1, three cells 14 may be disposed in a reclined position, one on top of the other, in a stack formation. The arrangement of the uppermost level of internal energy cell components is illustrated in FIG. 3. A recess 20 in the topmost layer of internal energy cell components allows the energy cells 16 of the bottom layer to be partially visible in FIG. 1 and FIG. 3. FIG. 3 also shows a schematic representation of a control circuit 18 disposed between adjacent energy cells 12. As will be explained in further detail herein, it is generally preferred, although not required, that the control circuitry is embodied on a flexible ribbon-like circuit board to allow it to be easily accommodated within an internal energy cell assembly. Not shown in FIG. 1, energy cells 12 are recessed within a housing 24, being spaced from the top of the housing by a recess 26. With the advent of commercially affordable very low profile control circuitry, it may be possible to dispose some or all of the control circuitry atop the energy cells. However, at this time this would be prohibitively expensive.

As shown in FIGS. 1-3, the bottom array may contain fifteen energy cells, while the top array shown in FIG. 3 may contain thirteen energy cells, for a total of 28 energy cells for battery pack 10. Compared to conventional 24 cell 2590-type battery packs, the lithium ion battery packs disclosed herein provide substantially increased capacity. At the same time, the lower output voltage remains about the same, the current draw across each cell is less, the operating temperature is reduced, and the overall weight of the battery is not increased appreciably. To obtain a further advantage in overall battery capacity over conventional 24 cell 2590-type battery packs, 3.1 Ah energy cells may be used in battery pack 10 rather than 3.0 Ah energy cells.

Figure 4:
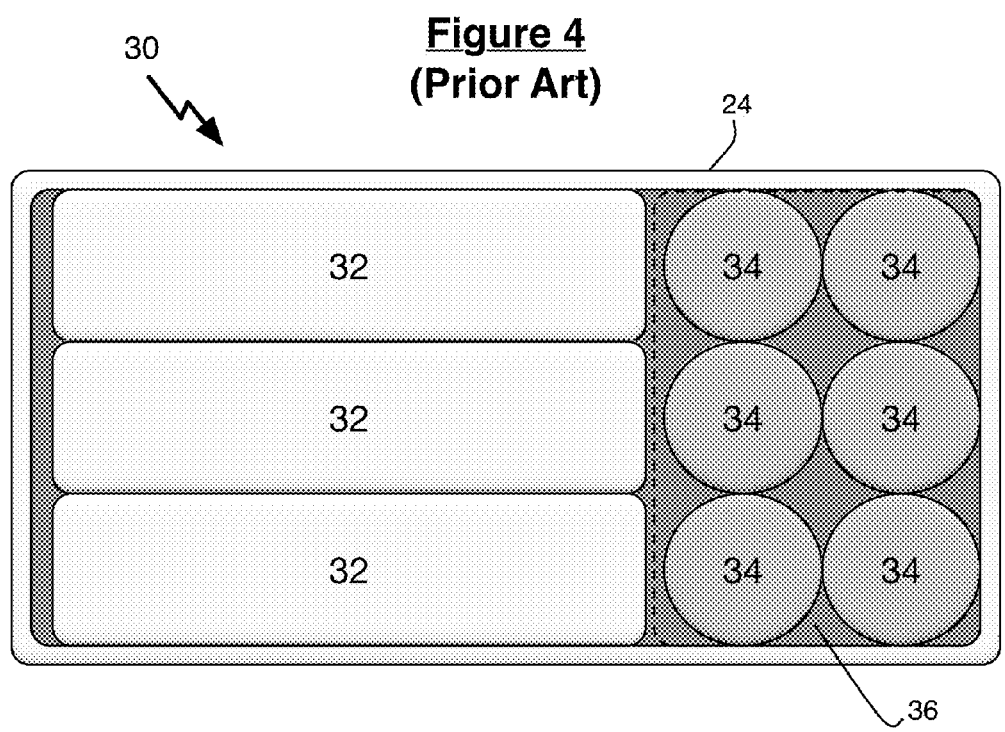
FIG. 4 is an example of a prior art battery pack.

An example of a prior art 2590-type battery pack 30 having 24 energy cells is shown in FIG. 4. An array of eighteen reclining energy cells 32 are arranged in three vertically oriented stacks, such that each stack contains six energy cells 32. An array of six upright energy cells 34 is located at the bottom of housing 34. A recess 36 is disposed above energy cells 34 to allow space for electrical connectors for connecting battery pack 30 to an external load.

Interconnect wires and strips may be used to connect batteries and components. For example, in the bottom layer of the internal energy cell arrangement of battery pack 10, instead of conductive straps, interconnect wires 46 may be used to couple the individual energy cells to one another and to the remaining circuitry of the battery pack. In the upper layer of internal energy cell arrangement of battery pack 10, the energy cells may be connected by interconnect straps 48. A flexible control circuit 18 may also be inserted between energy cells of the upper layer for controlling the energy cells.

As mentioned above, the prior art 2590-type lithium ion rechargeable battery pack 30 includes two independent 15 V sections or packs, each with twelve cells and separate control and protection circuitry and battery capacity gauges for each pack, that allow operation of the battery in either 15 V or 30 V modes. The prior art conventional 2590-type battery includes a pair of battery packs, pack A and pack B, that operate in combination, unlike the battery packs disclosed herein. The combination operates in parallel or in series depending on how the connector on the battery engages the end device. Both packs A and B have their own protection, balancing, and fuel gauging circuitry. Each individual pack has twelve 18650-type cells connected in a 4 series, 3 parallel connection (known as 4S3P). This can then result in a 4S6P or 8S3P configuration when the connector is engaged with the end device. For example, a pack assembled in a 4S6P configuration (four cells in series, six strings in parallel) Li-ion pack using 18650 cells (18-mm diameter, 65-mm length, 2.4 Ah), provides 14.4 V and 14.4 Ah of capacity. Thus, a conventional 2590 battery pack is limited to a total of twenty-four energy cells and a total watt-hour capacity of (3.7 V/cell) (number of energy cells) (Ah rating of the energy cell). For example, the use of 3.0 Ah 18650 energy cells would yield a capacity of (3.7V/cell) (24 energy cells) (3.0 Ah) or 266.4 Wh. A significant advantage of the battery packs disclosed herein is the use of a homogenous design that eliminates the use of two packs so as to eliminate the possibility of an imbalance between multiple packs as in a conventional 2590-type battery pack design. Out of balance packs result in a truncated run time on the 8S discharge due to one of the battery packs striking its low voltage cutoff before the other pack.

Relying on the existing draft angles of the conventional plastic housing of a conventional 2590 battery pack, along with a novel packing configuration, 28 cells can be positioned within the standard plastic housing of a conventional 2590-type battery. A representative diagram of the disclosed battery configuration is shown in FIG. 1.

A table of representative values for a typical 2590-type battery pack is as follows:

| | |
|---|---|
| Model | Ultralife BB-2590 Rechargeable Battery |
| Nominal Dim - Length | 4.40 in-112.5 mm |
| Nominal Dim - Width | 2.45 in-62.5 mm |
| Nominal Dim - Height | 5.0 in-127.0 mm |
| Nominal Dim - Weight | 3.10 lb (1.4 kg) |
| Packs (sections) | 2 (12 energy cells each) |
| Nominal Dim - Maximum Voltage | 33 V, Two (2) 16.5 V sections |
| Nominal Dim - Nominal Voltage | 28.8 V, Two (2) 14.4 V sections |
| Nominal Dim - Capacity - Series (32.8 v) Mode (Pack A and Pack B Connected in Series) | 6.2 Ah @ 28.8 V |
| Nominal Dim - Capacity - Parallel (16.4 v). Mode (Pack A and Pack B Connected in Parallel) | 12.4 Ah @ 16.5 V |
| Nominal Dim - Storage Temperature Range | 20° C. to +55° C. (−4° F. to +131° F.) |
| Exterior/Housing- | Hard plastic, black (Noryl N190X-701) |
| temporary thermal disabling device | 70 + − 5° C. internal pack temperature |
| permanent thermal disabling device | 68° C. extended storage temperature |

These nominal specifications pertain to military batteries and other products manufactured by Ultralife Corporation, headquartered in Newark, N.Y.

As mentioned above, the disclosed battery packs may have a resulting cell count (28 cells) that is not divisible by eight and, if used in a standard dual pack 2590-type configuration, would result in two separate packs where a mix of 3 or 4 batteries are used in parallel. For example, to form the first pack three batteries connected in parallel could be connected in series to four batteries in parallel, which are then connected in series to another seven batteries in the same configuration. Such a result is undesirable because three batteries in parallel will provide different Wh capacity compared to the four batteries in parallel. Instead, a battery design utilizing one pack (pack A or B only) may be employed to provide a 4S7P configuration.

As mentioned, the disclosed battery pack also may include only a single set of protection, balancing, and fuel gauge circuitry. Moreover, due to the increased parallel connections, an additional ptc (positive temperature coefficient) parallel break may be provided to account for any cell failures along the parallel string. The circuit may then be regulated at the 29 V end (using various methods) to simulate the eight cell series connection, thus resulting in an effective 8S3.5P output. This results in a higher intrinsic watt-hour capacity than a conventional 2590 battery pack. For example, an arrangement of the same 3.0 Ah 18650 cells may yield a capacity of (3.7V/cell) (28 cells) (3.0 Ah) or 310.8 Wh. This may increase in capacity by 16.7% from the same 18650 cells used in a conventional 2590 battery pack versus the disclosed improved 2590 battery pack design with the present new battery configuration.

Tests relating to a conventional 2590 battery pack and an embodiment of the disclosed improved 2590 battery pack were performed. The test run for the conventional battery pack was run in a single pack configuration, and the test run for the embodiment of the disclosed improved battery pack was run in the configuration described above. The conventional battery pack exhibited a capacity of about 103 Wh (corrected), which translates to about 206 Wh as a double pack configuration. The disclosed improved battery pack exhibited a capacity of about 304 Wh (corrected).

A range of anticipated operating temperatures often lies at the heart of extreme applications. A battery pack may be continuously monitored to manage its thermal loading. Often the primary temperature-related concern arises from temperature changes that are dependent on the amount of current drawn from the pack (i.e., greater current results in greater heat generation). These temperature increases, both within and outside the battery pack, may be factored into the design of the battery pack and portable device. Thermal monitoring and heat dissipation within the battery pack is critical for high-temperature operation.

Temperature-related concerns are not limited to high temperature levels. The performance of rechargeable Li-ion batteries starts to suffer as the temperature drops below 0° C., causing the internal impedance of the battery to increase. Cell capacity is also reduced at lower temperatures. If these cells are used or stored at or below −50° C., irreparable damage may occur under certain conditions to internal separators within the cells, making the cells a safety hazard.

For example, the table below shows physical, electrical, and environmental requirements that may apply to the disclosed improved battery pack:

| Physical Requirements | |
|---|---|
| Size (includes PCB connector board) | 4.369" × 2.419" × 4.969" |
| Weight | 3.1 lbs |
| Electrical Requirements | |
| Nominal capacity | 21 Ah (14.4 V), 10.5 Ah (28.8 V) |
| Output side (line) voltage | Battery terminal voltage: 14.4 V, 28.8 V |
| Output current rating | 16 A in 14.4 V mode, 8 A in 28.8 V mode |
| Fuel Gauge accuracy | Fuel gauge accuracy is 5% |
| Overcharge protection | Circuit protects against an overvoltage on the battery pack by opening the charge FET at 17.5 V in 14.4 V mode. The charge FET remains open until the voltage drops to a maximum of 16.4 V. |
| Discharge protection | Battery enters self protection mode to prevent over discharge of battery under 9.6 V (in 14.4 V mode). |
| Overcurrent protection | Battery opens the discharge FET upon an current above 18 A (time within 1 s in 14.4 V mode) |
| Short circuit protection | Battery opens the discharge FET upon a short circuit (time within 500 ms) |
| Discharged storage | After battery shuts down due to low state of charge, the battery survives six months in discharged state without losing more than 15% of its original capacity. |
| Data information | Data is available under standard SMBus protocol |
| Connectivity | Battery contains connector pinout listed below<br>Pin 1 Battery 1 negative<br>Pin 2 Battery 2 negative<br>Pin 3 Battery 1 postive<br>Pin 4 Battery 1 positive<br>Pin 5 Battery 2 positive |
| Environmental Requirements | |
| Operating temperature range | −20° C.-45° C. (discharge) |
| Storage temperature range | −40° C.-60° C. |
| Packaging | Abs/Polycarb blend |
| Mil-PRF-32383/3 | Battery meets requirement |

With the features described herein, the heat of the energy cells of battery pack 10 upon discharge is reduced since the heat on discharge follows a close relationship to a resistive heating function. The R (internal resistance of the energy cell) in the 4S6P configuration is R/6. The R in the 4S7P configuration (utilizing the same energy cell in both designs) is R/7. This results in a 14% drop in heat due to energy cell discharge since the parallel string has a lower parallel resistance.

The present disclosure provides an improved high watt-hour lithium ion rechargeable battery pack including a plurality of cells (not comprising a multiple of eight) and an electrical circuit to provide a battery pack that mimics eight cells in series. As will be seen herein, the 28 energy cells may be coupled together to achieve a maximum voltage which is substantially less than that of 28 energy cells coupled in series. Accordingly, the electrical control circuit may include a regulator with output voltage boosting circuitry to provide both of the desired 14.8V and 29.6V outputs. For example, the voltage boost circuitry can employ conventional switched-mode power supply techniques. In particular, the present disclosure relates to a battery pack comprising a non-multiple of eight cells of the type typically used in a 2590 battery pack and a corresponding mechanical packing assembly. The improved electromechanical design can provide an increased capacity of about 16% watt-hours more than a standard 2590 battery pack due to the increase in cell count (as a non-multiple of eight cells).

There are other substantial advantages of present battery pack designs according to principles described herein, in addition to the substantial increase in capacity mentioned above. These advantages include reduced heat of the cells upon discharge and avoidance of an imbalance in multiple internal battery packs. In a conventional 2590-type battery pack design, two 4 S protection circuits (each including overvoltage, undervoltage, overcurrent, and short circuit) must be employed, along with two 4 S fuel gauge circuits. Both control circuits are necessary to accomplish an 8 S voltage. By contrast, the disclosed improved battery packs require only one control circuit to provide voltage regulation (boost) as well as the protection, balancing, and fuel gauge circuit functions for all of the energy cells employed in battery pack 10. Since only a single control circuit is used, a substantial reduction in internal control components is achieved. Thus, both the complexity and cost of the battery pack are reduced.

The foregoing description and the accompanying drawings are illustrative of the invention disclosed herein. Still, other variations and arrangements are possible without departing from the spirit and scope of the invention. For example, although the battery pack and method according to the principles described herein have been explained above with regard to a particular commercial application, it will be readily appreciated that the present battery pack and method can be advantageously employed to provide improved measured dispensing of a variety of materials.

What is claimed is:

1. A battery pack for providing a source of electrical energy to a power device, comprising:
   a housing defining a hollow cavity;
   a plurality of rechargeable energy cells disposed within the hollow cavity of the housing;
   the energy cells each having a cathode terminal and an anode terminal supported within an outer cell housing;
   a plurality of conductive interconnects electrically coupled to the cathode and anode terminals of the energy cells, wherein the energy cells are coupled together in a 4S7P configuration;
   a control circuit electrically coupled to the energy cells that controls the operation of the energy cells during operation of the battery pack;
   a voltage regulator with a voltage boost function that can increase the output voltage of the energy cells to which it is coupled, wherein the control circuit operates the voltage boost function to select between a first voltage output mode or a second voltage output mode to simulate a 4S6P or 8S3P 2590 battery pack configuration respectively;
   a connector for electrically coupling at least one of the voltage regulator and the plurality of energy cells to one or more external devices; and
   a cover engaged with the housing to substantially enclose the energy cells, the control circuit, and voltage regulator within the housing, wherein the dimensions of the cover and the housing are consistent with a 2590 battery pack.

2. The battery pack according to claim 1 wherein the energy cells have a lithium ion chemistry.

3. The battery pack according to claim 1 wherein the energy cells have a lithium cobalt oxide chemistry.

4. The battery pack according to claim 1 wherein the cover and housing cooperate to form a water-tight seal.

5. The battery pack according to claim 4 wherein the cover and housing are made of injection molded plastics material.

6. The battery pack according to claim 1 wherein the control circuit is supported by a flexible substrate.

7. The battery pack according to claim 1 wherein the energy cells are coupled together to form a single pack.

8. The battery pack according to claim 7 further comprising temperature sensors distributed among the energy cells for measuring temperature wherein temperature sensors are electrically coupled to the control circuit and wherein the control circuit utilizes temperature data from the temperature sensors to control the operation of the energy cells during operation of the battery pack.

9. The battery pack according to claim 1, wherein the first voltage output mode provides a nominal voltage output of approximately 14.4V and the second voltage output mode provides a nominal voltage output of approximately 28.8V.

10. The battery pack according to claim 9, wherein the output current rating is approximately 16 A for the first voltage output mode and approximately 8 A for the second voltage output mode.

11. The battery pack according to claim 9, wherein the control circuit further performs fuel-gauge calculations on remaining cell capacity based on measurements of the energy cells.

12. The battery pack according to claim 11, wherein the control circuit further provides a serial data communications bus that is capable of communicating with a host device.

13. A battery pack for providing a source of electrical energy to a power device, comprising:
   a housing defining a hollow cavity;
   a plurality of rechargeable energy cells disposed within the hollow cavity of the housing;
   the energy cells each having a cathode terminal and an anode terminal supported within an outer cell housing;
   a plurality of conductive interconnects electrically coupled to the cathode and anode terminals of the energy cells, wherein the plurality of conductive interconnects provide a configuration of the energy cells that is not a 4S3P, 4S6P, or 8S3P configuration;
   a control circuit electrically coupled to the energy cells that controls the operation of the energy cells during operation of the battery pack;
   a voltage regulator with a voltage boost function that can increase the output voltage of the energy cells to which it is coupled, wherein the control circuit operates the voltage boost function to select between a first voltage output mode or a second voltage output mode to simulate a 4S6P or 8S3P 2590 battery pack configuration respectively;
   a connector for electrically coupling at least one of the voltage regulator and the plurality of energy cells to one or more external devices; and
   a cover engaged with the housing to substantially enclose the energy cells, the control circuit, and voltage regulator within the housing, wherein the dimensions of the cover and the housing are consistent with a 2590 battery pack.

14. The battery pack of claim 13, wherein the first voltage output mode provides a nominal voltage output of approximately 14.4V and the second voltage output mode provides a nominal voltage output of approximately 28.8V.

15. The battery pack of claim 14 further comprising one or more temperature sensors distributed among the energy cells for measuring temperature and the one or more temperature sensors electrically coupled to the control circuit, and wherein the control circuit utilizes temperature data from the one or more temperature sensors in controlling the operation of the energy cells during operation of the battery pack.

16. The battery pack of claim 15 further comprising an edge temperature sensor located on an inside edge of the housing for measuring temperature and the edge temperature sensor electrically coupled to the control circuit.

17. The battery pack according to claim 14, wherein the output current rating is approximately 16A for the first voltage output mode and approximately 8A for the second voltage output mode.

18. The battery pack according to claim 14, wherein the control circuit further performs fuel-gauge calculations on remaining cell capacity based on measurements of the energy cells.

19. The battery pack according to claim 18, wherein the control circuit further provides a serial data communications bus that is capable of communicating with a host device.

* * * * *